(12) United States Patent
Liu et al.

(10) Patent No.: US 10,920,903 B2
(45) Date of Patent: *Feb. 16, 2021

(54) WATER STOP VALVE

(71) Applicant: LAB (XIAMEN) SANITARY FITTINGS INC., Xiamen (CN)

(72) Inventors: Yongmao Liu, Xiamen (CN); Zipeng Zhang, Xiamen (CN)

(73) Assignee: LAB (XIAMEN) SANITARY FITTINGS INC., Fujian (CN)

( * ) Notice: Subject to any disclaimer, the term of this patent is extended or adjusted under 35 U.S.C. 154(b) by 86 days.

This patent is subject to a terminal disclaimer.

(21) Appl. No.: 16/340,381

(22) PCT Filed: Jan. 24, 2017

(86) PCT No.: PCT/CN2017/072317
§ 371 (c)(1),
(2) Date: Apr. 9, 2019

(87) PCT Pub. No.: WO2018/137052
PCT Pub. Date: Aug. 2, 2018

(65) Prior Publication Data
US 2020/0049273 A1 Feb. 13, 2020

(51) Int. Cl.
*F16K 31/28* (2006.01)
*F16K 31/24* (2006.01)
*E03D 1/32* (2006.01)

(52) U.S. Cl.
CPC .............. *F16K 31/28* (2013.01); *E03D 1/32* (2013.01); *F16K 31/24* (2013.01); *Y10T 137/7413* (2015.04); *Y10T 137/7472* (2015.04)

(58) Field of Classification Search
CPC . F16K 31/28; F16K 31/24; E03D 1/32; Y10T 137/7413; Y10T 137/7472
USPC .......................................................... 251/234
See application file for complete search history.

(56) References Cited

U.S. PATENT DOCUMENTS

| | | | | |
|---|---|---|---|---|
| 2,143,204 A | * | 1/1939 | McCormack | F16K 31/24 251/25 |
| 2,986,155 A | * | 5/1961 | Doyle | F16K 31/34 137/218 |
| 3,495,803 A | * | 2/1970 | Schmuck | E03D 1/32 251/25 |
| 4,180,096 A | * | 12/1979 | Johnson | E03D 1/32 137/403 |

(Continued)

*Primary Examiner* — Umashankar Venkatesan
(74) *Attorney, Agent, or Firm* — Leong C. Lei

(57) ABSTRACT

Disclosed is a water stop valve. A water inlet channel, a water outlet channel, and a water sealing surface are formed in a valve body. A valve stem has a middle portion movably disposed in the valve body and a lower portion mounted in a back-pressure hole of a water-plugging stopper. A back-pressure cavity is formed above the water-plugging stopper. A sealing end surface matching the back-pressure hole is formed on the valve stem. When in use, the valve stem drives the water plugging stopper to move downwards, the sealing end surface blocks the back-pressure hole, and the water plugging stopper blocks the water sealing surface, such that the water enters the back-pressure cavity, and the water pressure enables the water-plugging stopper to block the water sealing surface to stop the water. The water stop valve stops a water inlet valve from feeding in water in a timely manner.

10 Claims, 15 Drawing Sheets

(56) References Cited

U.S. PATENT DOCUMENTS

| | | | | |
|---|---|---|---|---|
| 5,255,703 A | * | 10/1993 | Johnson | E03D 1/32 137/414 |
| 5,904,176 A | * | 5/1999 | Li | E03D 1/32 137/414 |
| 6,712,090 B1 | * | 3/2004 | Brandelli | E03D 1/32 137/410 |
| 6,913,035 B2 | * | 7/2005 | Huang | E03D 1/32 137/425 |
| 9,422,699 B2 | * | 8/2016 | Li | E03D 1/32 |

* cited by examiner

WATER STOP VALVE

BACKGROUND OF THE INVENTION

1. Field of the Invention

The present invention relates to a water inlet valve, and more particularly to a water stop valve.

2. Description of the Prior Art

A conventional water inlet valve generally includes a water inlet pipe, a top cover, a back-pressure pad, a swing arm, a float, and a water stop tank. The lower end of the water inlet pipe is installed on a water supply pipe of the water tank. The top cover is installed at the upper end of the water inlet pipe. The top cover is formed with a back-pressure hole. The middle portion of the swing arm is pivotally connected to the top cover. One end of the swing arm faces the back-pressure hole and is connected with the back-pressure pad. The other end of the swing arm is connected with an adjustment rod of the float. The float is installed in the water stop tank. The water stop tank is installed on the water inlet pipe. Sealing members are provided between the components to ensure water tightness.

In use, when the water level of the water stop tank lowers, the float is lowered by the gravity and the swing arm is deflected, so that the back-pressure pad opens the back-pressure hole, and the water flows from the water supply pipe through the water inlet pipe, the top cover and the back-pressure hole to the water tank to feed in water. When the water level of the water stop tank rises, the float is lifted by the buoyancy and the swing arm is deflected, so that the back-pressure pad closes the back-pressure hole, and the back-pressure pad blocks the water inlet to stop water.

Another conventional water inlet valve includes a valve body, a valve cover, a water stop pad, a first crank arm, a second crank arm, a control rod, a float, and a water stop tank. The valve cover is installed in the valve body to form a water inlet cavity with the valve body. A water stop surface having a water inlet hole is formed in the water inlet cavity. A water inlet end of the water inlet cavity communicates with a water inlet channel. A water outlet end of the water inlet cavity communicates with a water outlet channel. The water stop pad is mounted on the valve cover over the water stop surface. The water stop pad is formed with a water-passing hole. A back-pressure cavity is formed between the water stop pad and the valve cover. The valve cover is formed with a back-pressure hole. The back-pressure hole communicates with the back-pressure cavity and the outside. The second crank arm is pivotally connected to the valve cover through a second rotating shaft perpendicular to the valve cover. The second rotating shaft divides the second crank arm into a long arm and a short arm. The end of the long arm is a free end. The fixed end of the first crank arm is pivotally connected to the valve cover through a first rotating shaft perpendicular to the valve cover. The free end of the first crank arm is slidably connected to the short arm of the second crank arm across the back-pressure hole. The first crank arm is provided with a back-pressure pad opposite to the back-pressure hole. The free end of the long arm is connected with a control rod disposed on the float. The float is disposed in the water stop tank. The water stop tank is mounted on the valve body.

When the water level of the water stop tank lowers, the float is lowered by gravity, and the control lever is lowered to drive the second crank arm to swing downward, the first crank arm is driven to swing away from the back-pressure hole, so that the back-pressure pad opens the back-pressure hole, and the water enters the water tank through the water inlet channel of the valve body to feed in water. When the water level of the water stop tank rises, the float is lifted by the buoyancy, and the control rod is lowered, and the second crank arm is swung upward to drive the first crank arm to swing close to the back-pressure hole, so that the back-pressure pad closes the back-pressure hole again. The water stop pad generates back pressure and is deformed to seal the water inlet hole of the water stop surface to stop water.

The water inlet valve is provided with a water leakage hole at the bottom of the water stop tank. After the water level of the water tank is lowered, the water in the water stop tank enters the water tank through the water leakage hole, so that the float loses buoyancy and is lowered by gravity, which causes the swing arm to deflect and open the back-pressure hole to feed in water. However, after the water tank is used for a period of time, it is prone to failure and cannot be closed. For example, the drain valve leaks. At this time, the water inlet valve continues to feed in water, and the water tank continues to leak, resulting in waste of water resources.

SUMMARY OF THE INVENTION

The primary object of the present invention is to provide a water stop valve which is capable of stopping a water inlet valve from feeding in water in a timely manner and has a long service life.

In order to achieve the above object, the present invention adopts the following solutions.

A water stop valve comprises a valve body, a valve stem, a water plugging stopper, and a drive mechanism. A water inlet channel and a water outlet channel are formed in the valve body. A water sealing surface is disposed between the water inlet channel and the water outlet channel. The water sealing surface is in communication with the water inlet channel and the water outlet channel. A cavity is formed in the valve body above the water sealing surface. A mounting hole is formed in the valve body above the cavity. A middle portion of the valve stem is movably and sealedly mounted in the mounting hole. An upper portion of the valve stem extends out of the mounting hole and is connected to the drive mechanism. The drive mechanism drives the valve stem to move up and down. A back-pressure hole is formed in the water plugging stopper. A lower portion of the valve stem is movably mounted in the back-pressure hole of the water plugging stopper. The water-plugging stopper is disposed in the cavity. A water-passing gap is defined between the water-plugging stopper and the cavity. A back-pressure cavity is formed above the water-plugging stopper. The water-passing gap is in communication with the water inlet channel and the back-pressure cavity. The back-pressure cavity is in communication with the back-pressure hole. The back-pressure hole is in communication with the water outlet channel. A sealing end surface matching the back-pressure hole is formed on the valve stem. When the valve stem moves upwards, the sealing end surface opens the back-pressure hole, and the water inlet channel is in communication with the water outlet channel to feed in water. When the valve stem moves downwards and drives the water plugging stopper to move downwards, the sealing end surface blocks the back-pressure hole, and the water plugging stopper blocks the water sealing surface, such that water enters the back-pressure cavity via the water-passing gap, and water pressure enables the water-plugging stopper to block the water sealing surface to stop the water.

Preferably, the lower portion of the valve stem is formed with a reduced neck section, and the reduced neck section of the valve stem is inserted in the back-pressure hole of the water plugging stopper.

Preferably, the reduced neck portion has a length greater than that of the back-pressure hole.

Preferably, the sealing end surface is a wedge surface, and an upper end of the back-pressure hole is formed with a sealing slope matching the wedge surface.

Preferably, an annular raised rib is formed on the water sealing surface.

Preferably, a sealing piston is sleeved on the middle portion of the valve stem, and the sealing piston is sealedly matched with the mounting hole of the valve body.

Preferably, the water plugging stopper is composed of an injection-molded member and a rubber member. An accommodating cavity is formed in the injection-molded member. The rubber member is embedded and installed in the accommodating cavity of the injection-molded member.

Preferably, the drive mechanism includes a swing rod, a compression spring, a connecting rod, and a limiting member. A middle portion of the swing rod is pivotally connected to the valve body. One end of the swing rod is connected to the valve stem. The valve stem is moved up and down with the swing rod. Another end of the swing rod is connected to one end of the connecting rod. The compression spring is mounted in the valve body. One end of the compression spring abuts against the valve body, and another end of the compression spring abuts against the other end connected with the connecting rod of the swing rod for applying a force to swing the swing rod. The limiting member is movably mounted on the valve body. The limiting member is configured to restrict movement of the connecting rod. When the limiting member is pressed downwards to release the connecting rod, the compression spring drives the swing rod to swing and move the valve stem and the water plugging stopper downwards.

Preferably, the limiting member is movably mounted in the valve body. A spring is mounted between the limiting member and the valve body. When the limiting member is pressed downwards, the connecting rod is released.

Preferably, the valve body is provided with a mounting seat. A receiving cavity is formed between the mounting seat and the valve body. The limiting member is disposed in the receiving cavity. A hole is formed in the mounting seat. A middle portion of the limiting member is a limiting portion. A lower portion of the limiting member is inserted into the hole. The limiting portion of the limiting member has a diameter greater than that of the hole. One end of the spring abuts against the mounting seat, and another end of the spring abuts against the limiting portion of the limiting member.

Preferably, an upper end of the limiting member is provided with a wedge portion. The connecting rod is provided with a recess corresponding to the wedge portion. The wedge portion of the limiting member is inserted into the recess of the connecting rod to restrict movement of the connecting rod.

Preferably, the swing rod is connected to the connecting rod through an engaging block and an engaging groove.

Preferably, the swing rod is provided with the engaging block, and the connecting rod is provided with the engaging groove. The engaging block of the swing rod is engaged in the engaging groove of the connecting rod to connect the swing rod to the connecting rod.

Preferably, the connecting rod is radially connected to the swing rod.

After adopting the above solutions, when the water inlet valve leaks, the valve stem moves upwards, the sealing end surface opens the back-pressure hole, and the water inlet channel is in communication with the water outlet channel to feed in water. When the valve stem moves downwards and drives the water plugging stopper to move downwards, the sealing end surface blocks the back-pressure hole and the water plugging stopper blocks the water sealing surface, such that the water enters the back-pressure cavity via the water-passing gap, and the water pressure enables the water-plugging stopper to block the water sealing surface to stop the water. The water stop valve is capable of stopping a water inlet valve from feeding in water in a timely manner.

Furthermore, the invention utilizes the water plugging stopper to block the water sealing surface, such that the water enters the back-pressure cavity via the water-passing gap, and the water pressure enables the water-plugging stopper to block the water sealing surface to stop the water. The water plugging stopper can be reused many times, and has a longer service life than that of the conventional back pressure pad.

DETAILED DESCRIPTION OF THE PREFERRED EMBODIMENTS

Figure 1:
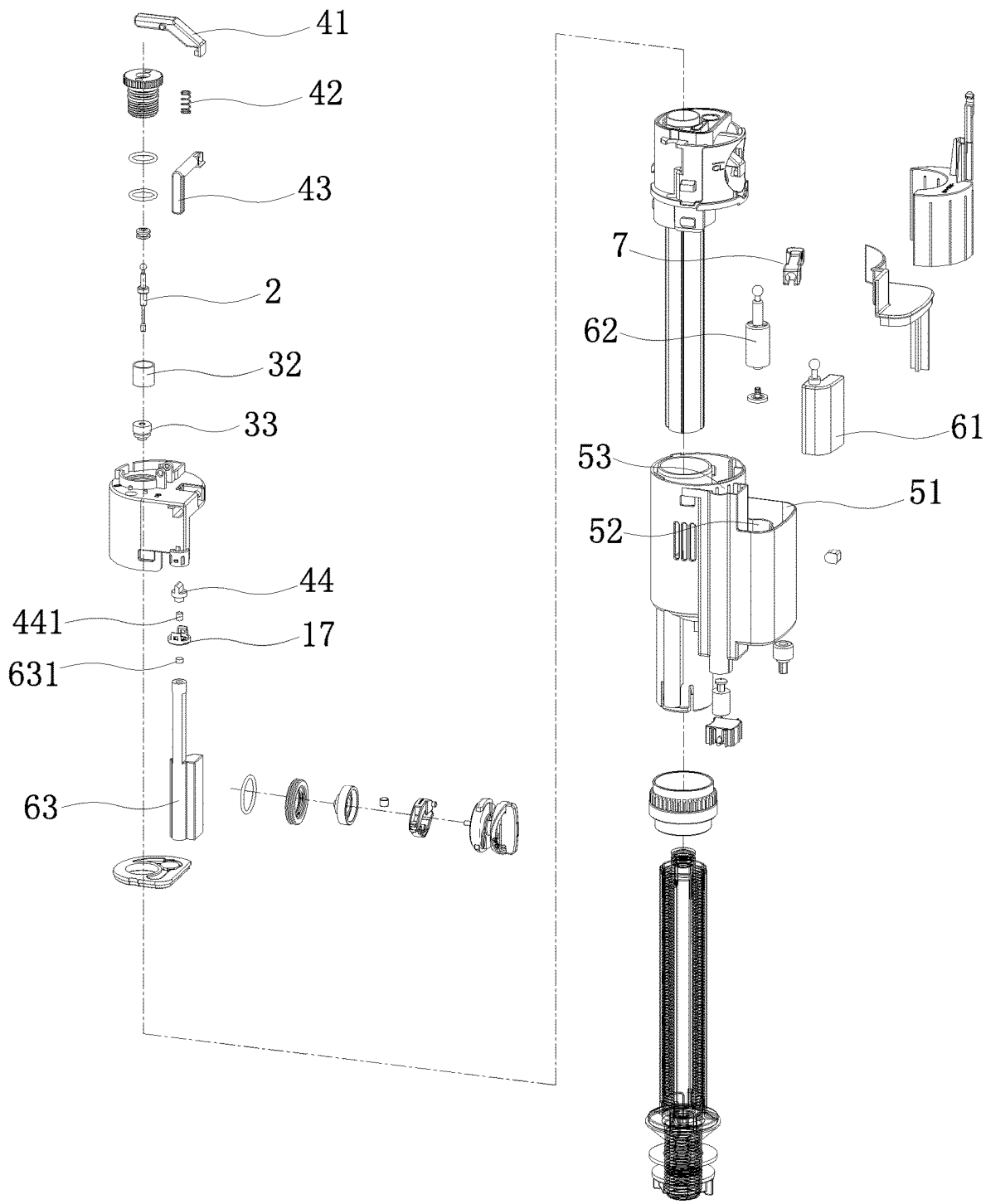
FIG. 1 is an exploded view of the present invention.
Figure 2:
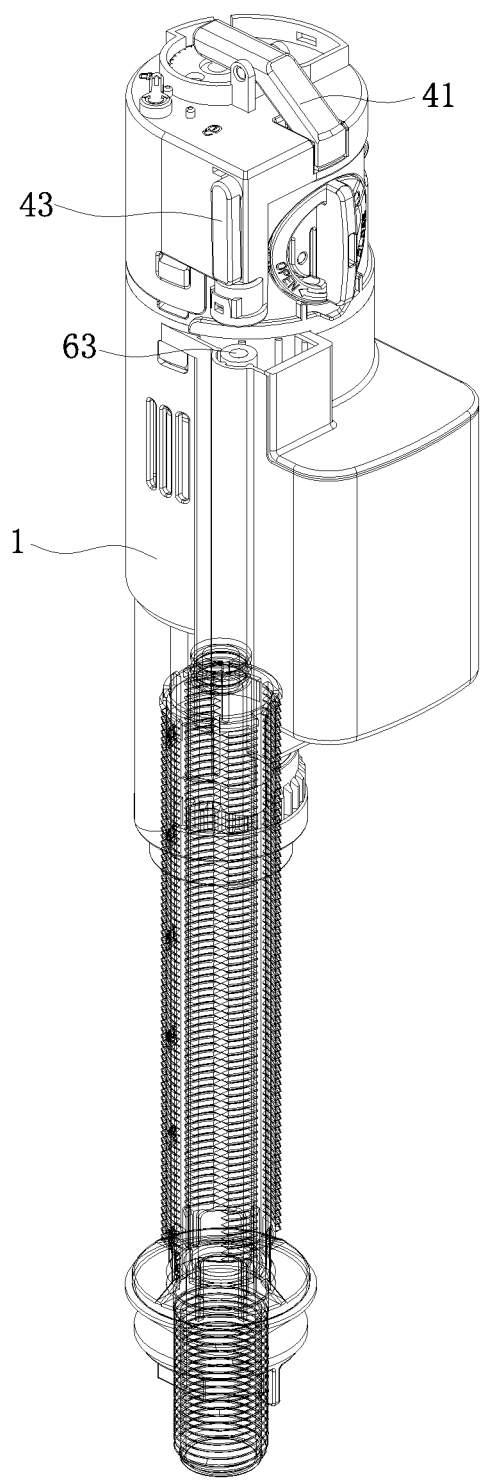
FIG. 2 is a schematic view of the present invention in a state of feeding in water.
Figure 3:
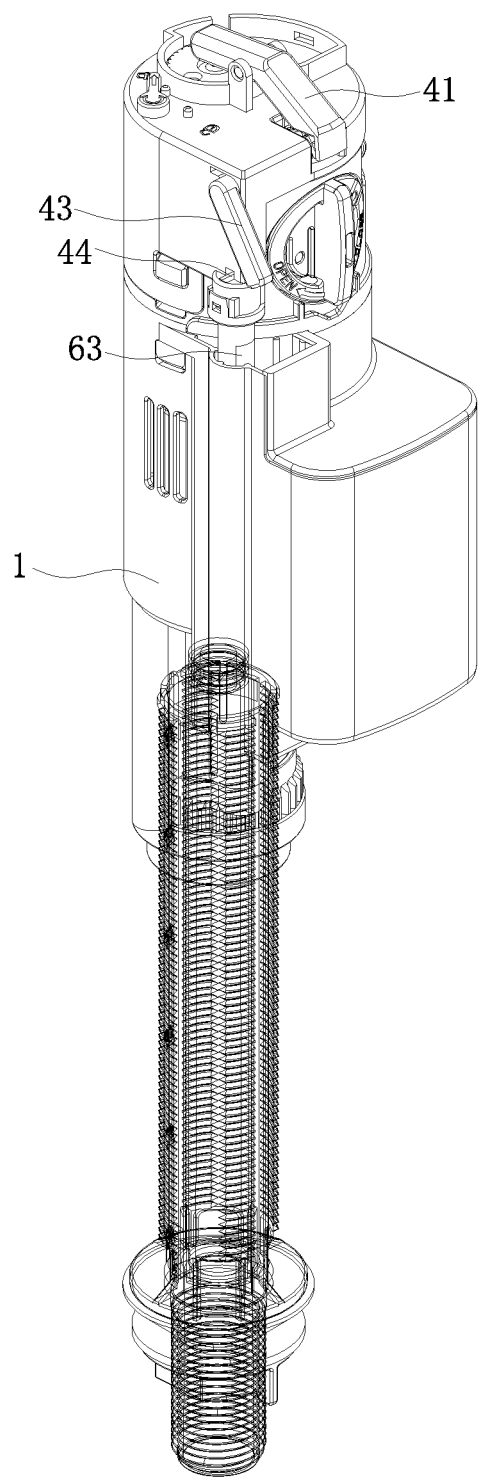
FIG. 3 is a schematic view of the present invention in a state of stopping water.
Figure 4:
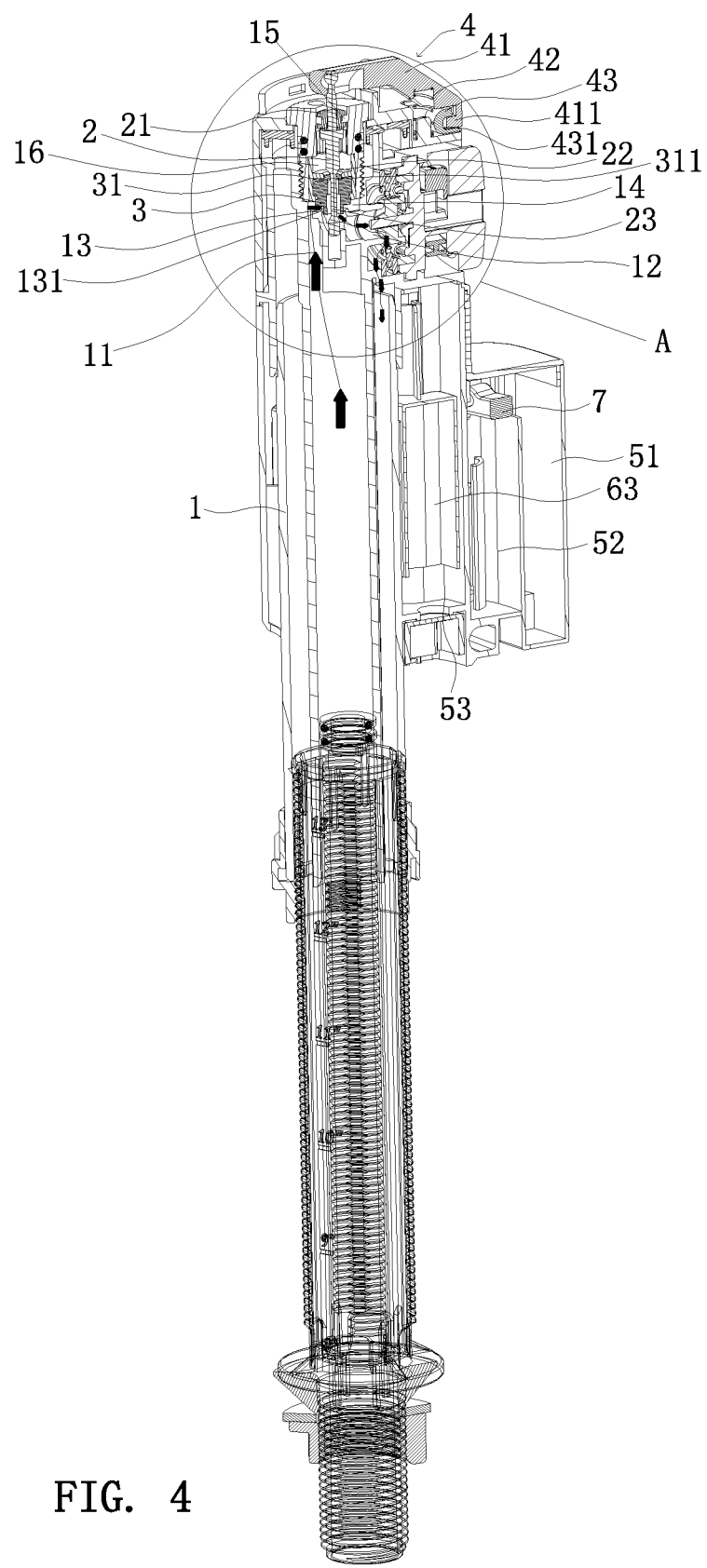
FIG. 4 is a cross-sectional view of the present invention in a state of feeding in water.
Figure 4B:
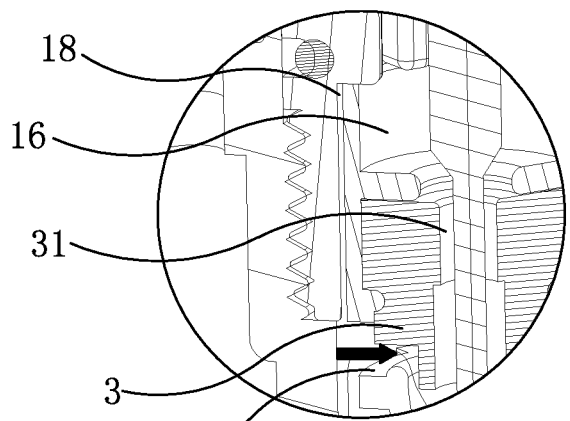
FIG. 4b is a partial enlarged view of circle B of FIG. 4.
Figure 4A:
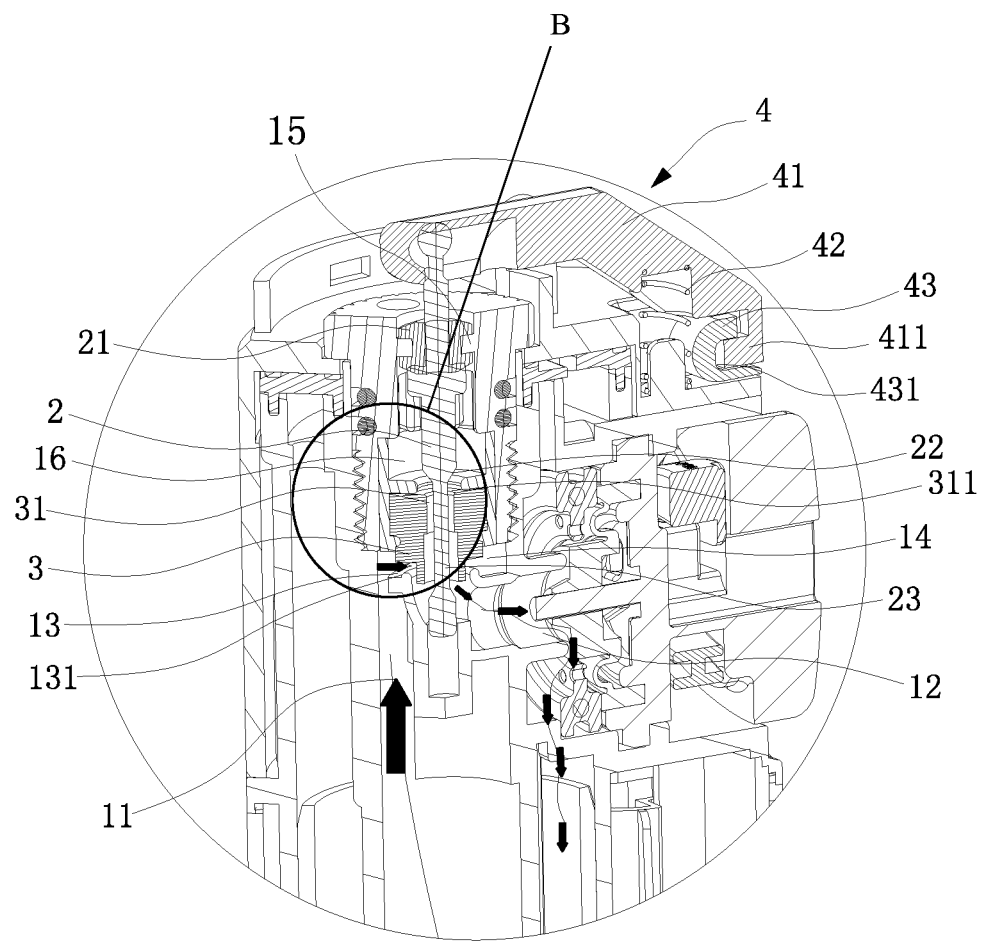
FIG. 4a is a partial enlarged view of circle A of FIG. 4.
Figure 5:
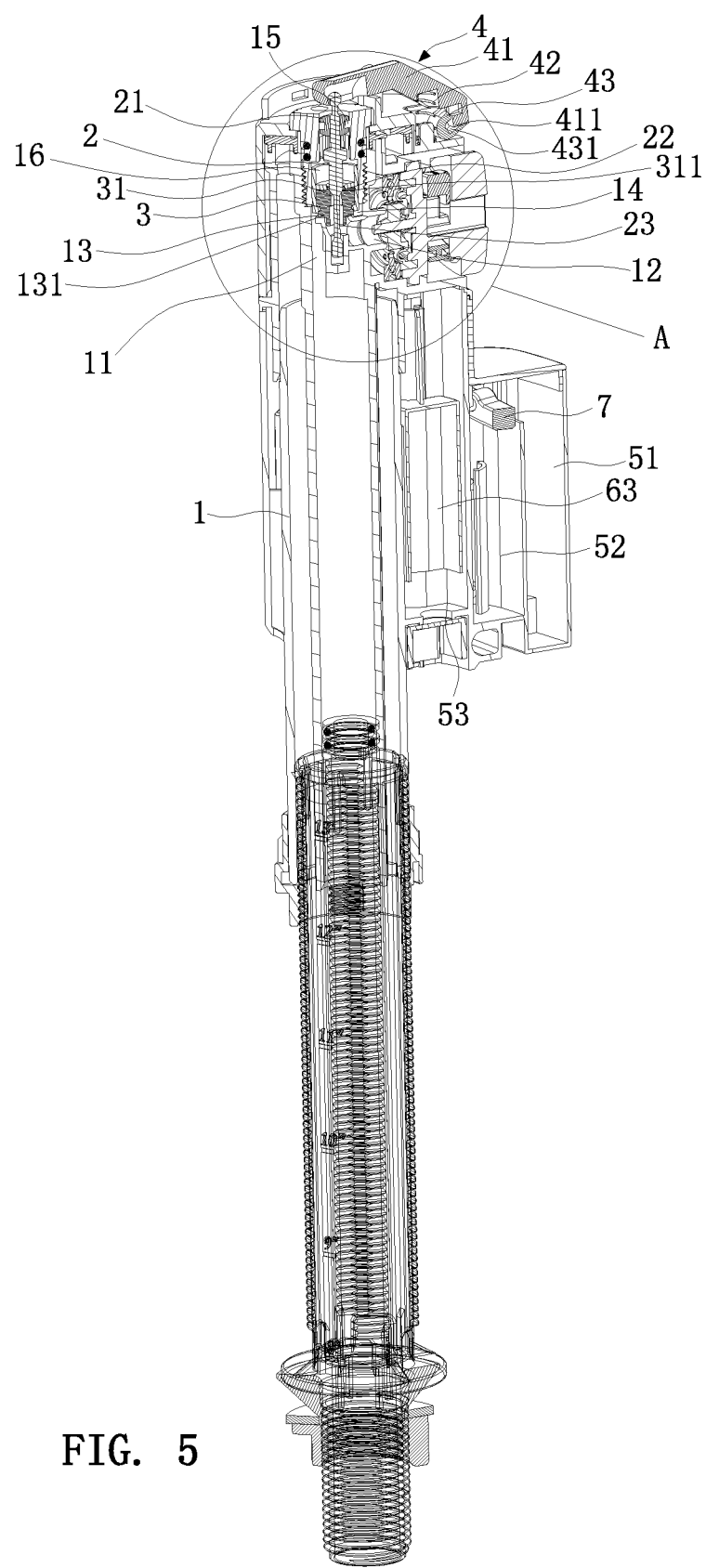
FIG. 5 is a cross-sectional view of the present invention in a state of stopping water.
Figure 5A:
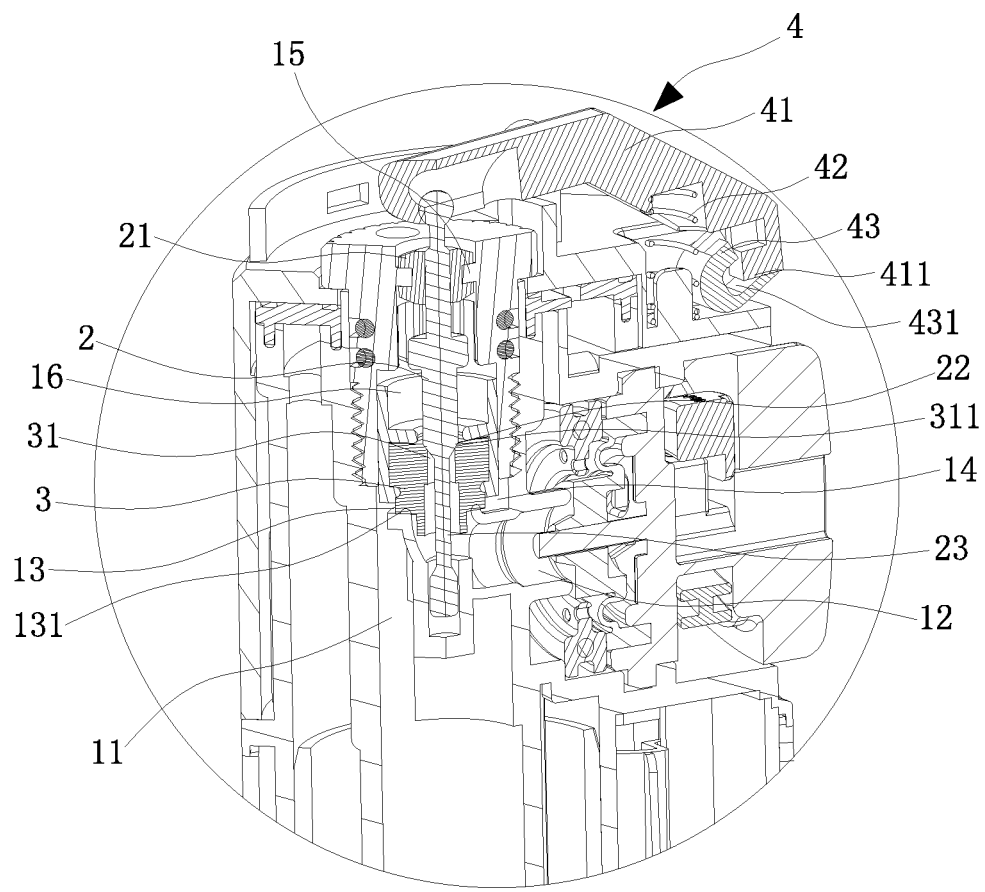
FIG. 5a is a partial enlarged view of circle A of FIG. 5.
Figure 6:
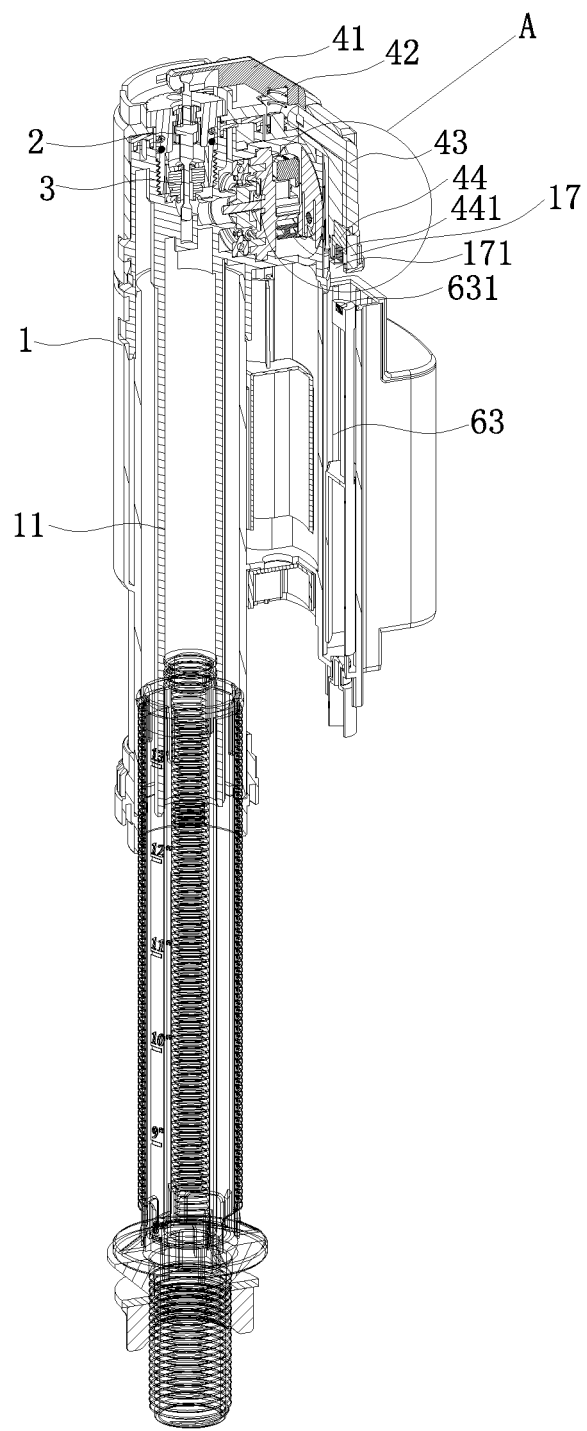
FIG. 6 is a cross-sectional view of the present invention, showing that the magnetic elements are separated from each other.
Figure 6A:
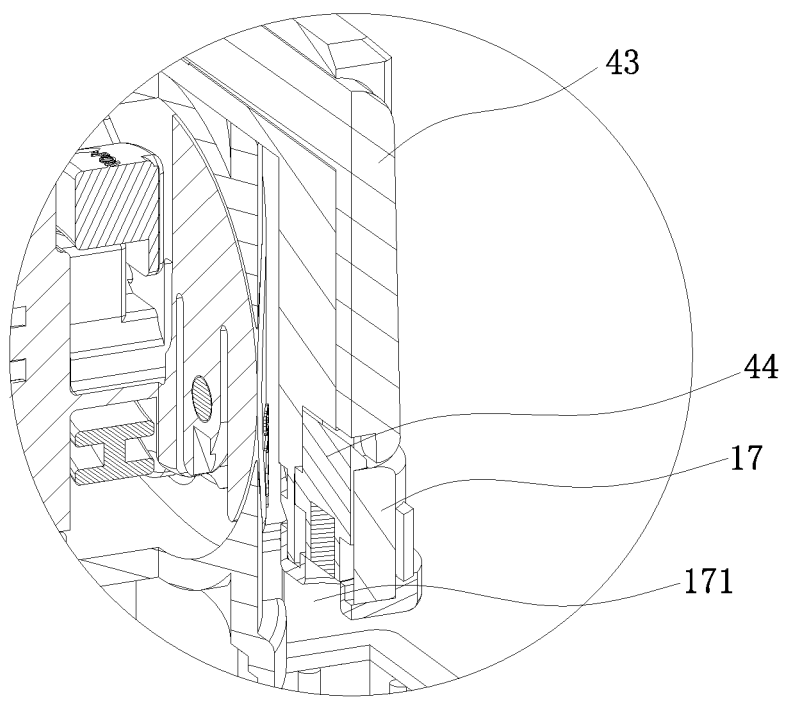
FIG. 6a is a partial enlarged view of circle A of FIG. 6.
Figure 7:
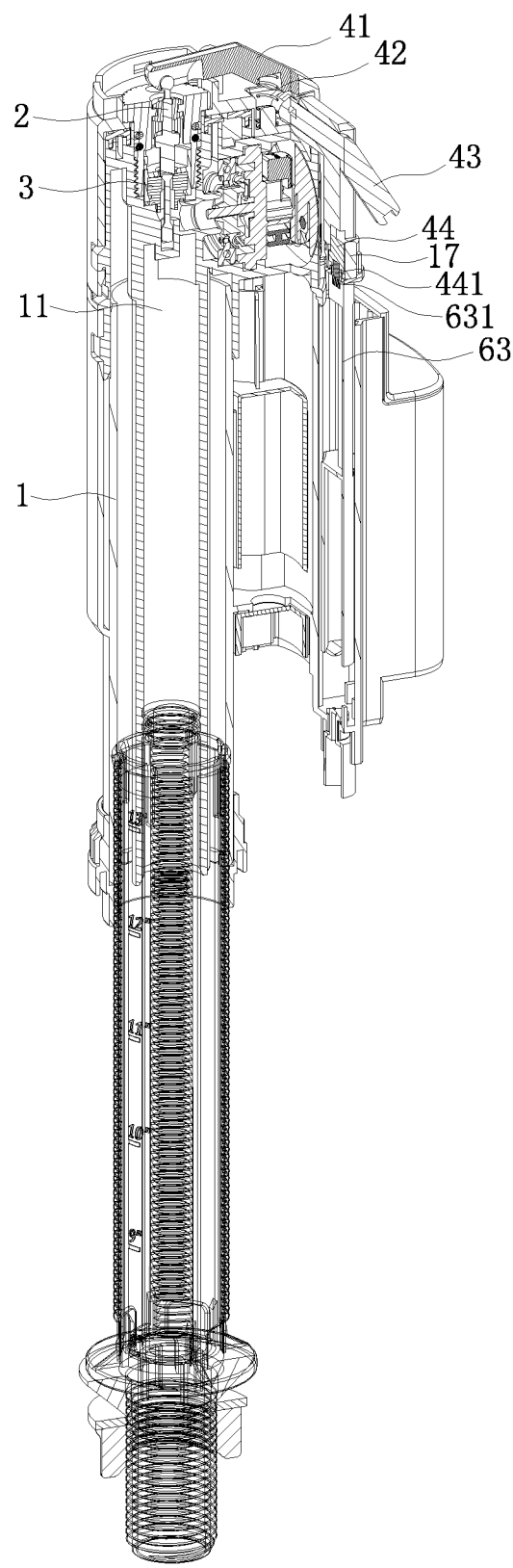
FIG. 7 is a cross-sectional view of the present invention, showing that the magnetic elements are attracted to each other.
Figure 8:
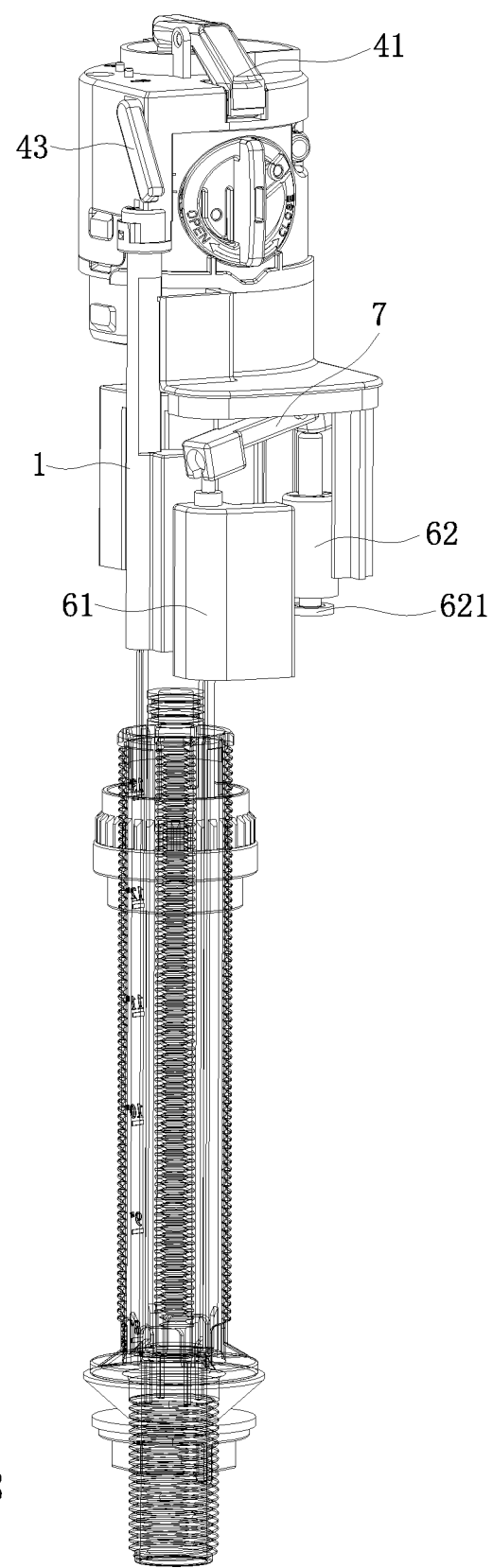
FIG. 8 is a schematic view showing the internal structure of the present invention.
Figure 9:
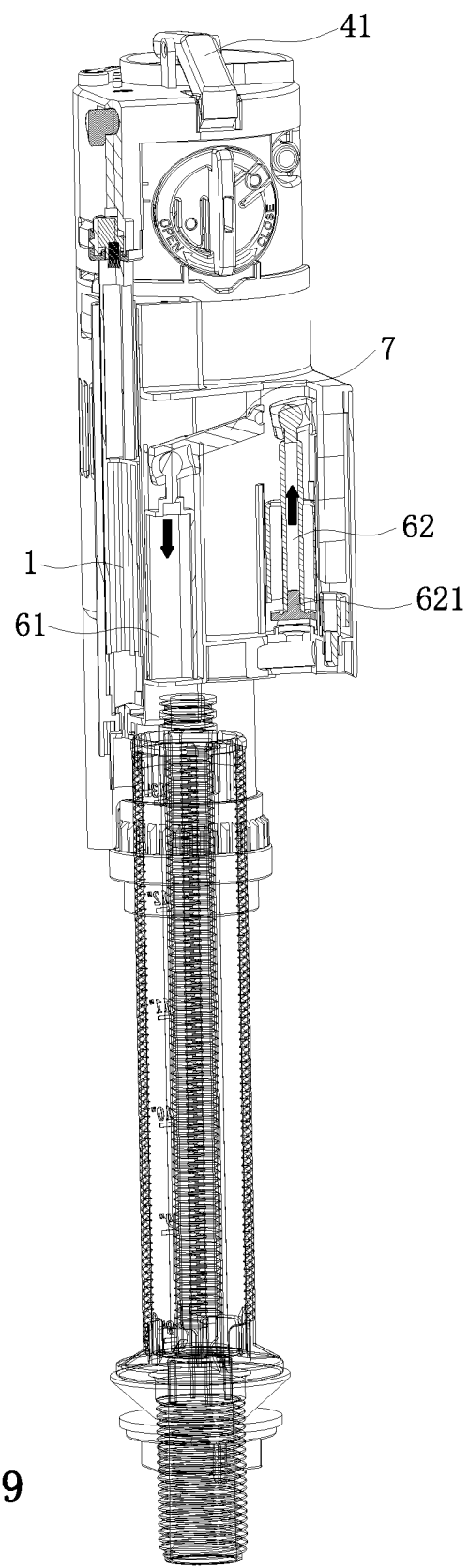
FIG. 9 is a schematic view of the present invention in a water leakage state.

Embodiments of the present invention will now be described, by way of example only, with reference to the accompanying drawings.

Referring to FIG. 1 to FIG. 14, the present invention discloses a water stop valve, comprising a valve body 1, a valve stem 2, a water plugging stopper 3, and a drive mechanism 4.

A water inlet channel 11 and a water outlet channel 12 are formed in the valve body 1. A water sealing surface 13 is disposed between the water inlet channel 11 and the water outlet channel 12. The water sealing surface 13 is in communication with the water inlet channel 11 and the water outlet channel 12. A cavity 14 is formed in the valve body 1 above the water sealing surface 13. A mounting hole 15 is formed in the valve body 1 above the cavity 14.

A middle portion of the valve stem 2 is movably and sealedly mounted in the mounting hole 15. A sealing piston 21 is sleeved on the middle portion of the valve stem 2. The sealing piston 21 is sealedly matched with the mounting hole 15 of the valve body 1. An upper portion of the valve stem 2 extends out of the mounting hole 15 and is connected to the drive mechanism 4. The drive mechanism 4 drives the valve stem 2 to move up and down. A back-pressure hole 31 is formed in the water plugging stopper 3. A lower portion of the valve stem 2 is movably mounted in the back-pressure hole 31 of the water plugging stopper 3. A gap is defined between the lower portion of the valve stem 2 and the side wall of the back-pressure hole 31.

The water-plugging stopper 3 is disposed in the cavity 14. A water-passing gap 18 is defined between the water-plugging stopper 3 and the cavity 14. A back-pressure cavity 16 is formed above the water-plugging stopper 3. The water-passing gap 18 is in communication with the water inlet channel 11 and the back-pressure cavity 16. The back-pressure cavity 16 is in communication with the back-pressure hole 31. The back-pressure hole 31 is in communication with the water outlet channel 12. A sealing end surface 22 matching the back-pressure hole 31 is formed on the valve stein 2. When the valve stein 2 moves upwards, the sealing end surface 22 opens the back-pressure hole 31, and the water inlet channel 11 is in communication with the water outlet channel 12 to feed in water. When the valve stein 2 moves downwards and drives the water plugging stopper 3 to move downwards, the sealing end surface 22 blocks the back-pressure hole 31 and the water plugging stopper 3 blocks the water sealing surface 13, such that the water enters the back-pressure cavity 16 via the water-passing gap 18, and the water pressure enables the water-plugging stopper 3 to block the water sealing surface 13 to stop the water.

For the water plugging stopper 3 and the water sealing surface 13 to be sealed better, an annular raised rib 131 is formed on the water sealing surface 13. In this embodiment, the lower portion of the valve stem 2 is formed with a reduced neck section 23. The reduced neck section 23 of the valve stem 2 is inserted in the back-pressure hole 31 of the water plugging stopper 3. Preferably, the length of the reduced neck portion 23 is greater than the length of the back-pressure hole 31. The sealing end surface 22 is a wedge surface. An upper end of the back-pressure hole 31 is formed with a sealing slope 311 matching the wedge surface, so that the sealing performance is better. The water plugging stopper 3 may be integrally formed. In this embodiment, as shown in FIG. 1, the water plugging stopper 3 is composed of an injection-molded member 32 and a rubber member 33. An accommodating cavity is formed in the injection-molded member 32. The rubber member 33 is embedded and installed in the accommodating cavity of the injection-molded member 32.

The drive mechanism 4 includes a swing rod 41, a compression spring 42, a connecting rod 43, and a limiting member 44. A middle portion of the swing rod 41 is pivotally connected to the valve body 1. One end of the swing rod 41 is connected to the valve stem 2. The valve stem 2 moves up and down with the swing rod 41. Another end of the swing rod 41 is connected to one end of the connecting rod 43. The compression spring 42 is mounted in the valve body 1. One end of the compression spring 42 abuts against the valve body 1. Another end of the compression spring 42 abuts against the other end connected with the connecting rod 43 of the swing rod 41 for applying a force to swing the swing rod 41.

The limiting member 44 is movably mounted on the valve body 1. The limiting member 44 is configured to restrict the movement of the connecting rod 43. When the limiting member 44 is pressed downwards to release the connecting rod 43, the compression spring 42 drives the swing rod 41 to swing and move the valve stem 2 and the water plugging stopper 3 downwards.

In this embodiment, the limiting member 44 is movably mounted in the valve body 1. A spring (not shown) is mounted between the limiting member 44 and the valve body 1. When the limiting member 44 is pressed downwards, the connecting rod 43 is released.

Specifically, the valve body 1 is provided with a mounting seat 17. A receiving cavity is formed between the mounting seat 17 and the valve body 1. The limiting member 44 is disposed in the receiving cavity. A hole 171 is formed in the mounting seat 17. A middle portion of the limiting member 44 is a limiting portion. A lower portion of the limiting member 44 is inserted into the hole 171. The diameter of the limiting portion of the limiting member 44 is greater than that of the hole 171. One end of the spring abuts against the mounting seat 17, and another end of the spring abuts against the limiting portion of the limiting member 44.

An upper end of the limiting member 44 is provided with a wedge portion. The connecting rod 43 is provided with a recess corresponding to the wedge portion. The wedge portion of the limiting member 44 is inserted into the recess of the connecting rod 43 to restrict the movement of the connecting rod 43. The swing rod 41 is connected to the connecting rod 43 through an engaging block and an engaging groove. Preferably, the swing rod 41 is provided with an engaging block 411, and the connecting rod 43 is provided with an engaging groove 431. The engaging block 411 of the swing rod 41 is engaged in the engaging groove 431 of the connecting rod 43 to connect the swing rod 41 to the connecting rod 43. In this embodiment, the connecting rod 43 is radially connected to the swing rod 41.

When the water inlet valve leaks, the limiting member 44 is pressed downwards to release the connecting rod 43, the compression spring 42 drives the swing rod 41 to swing and move the valve stein 2 and the water plugging stopper 3 downwards, the sealing end surface 22 blocks the back-pressure hole 31, and the water plugging stopper 3 blocks the water sealing surface 13, such that the water enters the back-pressure cavity 16 via the water-passing gap 18, and the water pressure enables the water-plugging stopper 3 to block the water sealing surface 13 to stop the water. When there is water leakage in the water tank, the water stop valve is capable of stopping a water inlet valve from feeding in water in a timely manner to save on water resources.

The drive mechanism 4 may be a conventional structure, such as a swing rod and a float. The middle portion of the swing rod is pivotally connected to the valve body 1. One end of the swing rod is connected to the valve stem 2, and the other end of the swing rod is connected to the float. The swing rod moves up and down along with the float, and the valve stem 2 is linked to move up and down.

The present invention further comprises an outer water tank 51, an inner water tank 52, a leak-proof water tank 53, an outer float 61, an inner float 62, a leak-proof float 63, and a lever 7.

Figure 10:
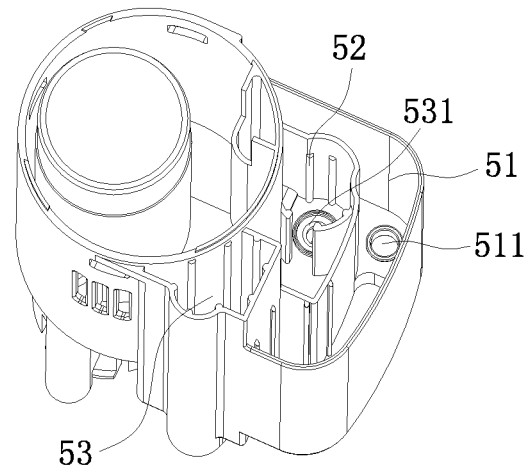
FIG. 10 is a schematic view of the water tank of the present invention.
Figure 11:
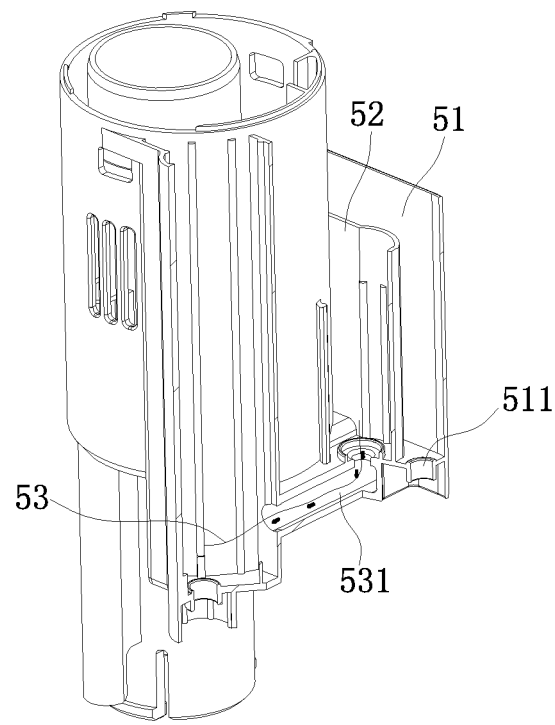
FIG. 11 is a cross-sectional view of the water tank of the present invention.

The outer water tank 51 is mounted on the valve body 1. The bottom of the outer water tank 51 is formed with a water inlet hole 511. As shown in FIG. 10 and FIG. 11, the inner water tank 52 is disposed in the outer water tank 51. The inner water tank 52 has a height lower than that of the outer water tank 51. The water overflows from the outer water tank 51 to the inner water tank 52.

The lever 7 is pivotally connected to the valve body 1. One end of the lever 7 is connected to the outer float 61. The outer float 61 is disposed in the outer water tank 51. The other end of the lever 7 is connected to the inner float 62. The inner float 62 is disposed in the inner water tank 52. A plug 621 is mounted to the lower end of the inner float 62.

Figure 12:
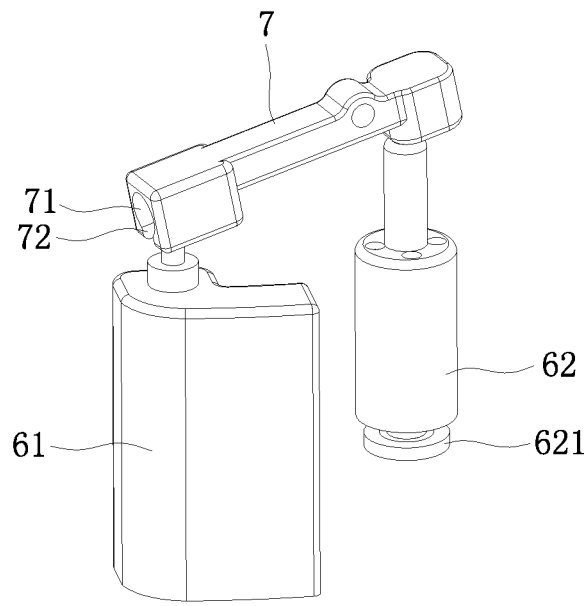
FIG. 12 is a schematic view showing the assembly of the lever and the float of the present invention.
Figure 13:
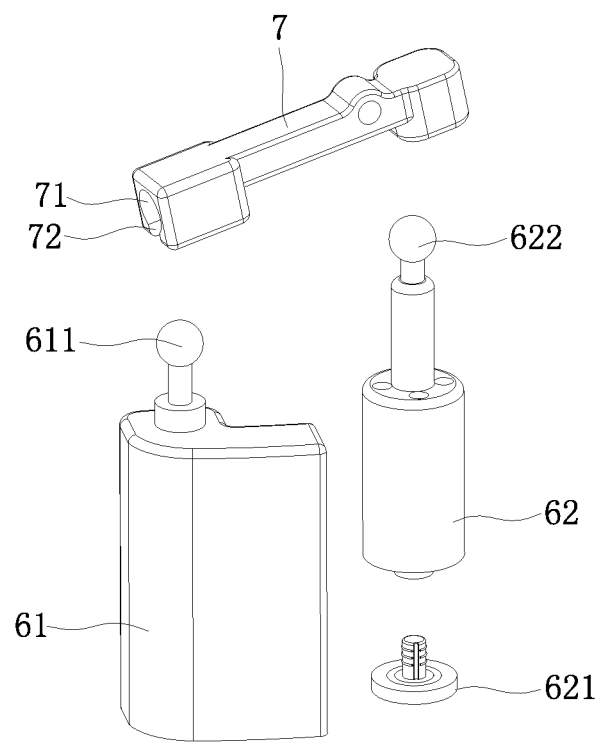
FIG. 13 is an exploded view showing the lever and the float of the present invention.
Figure 14:
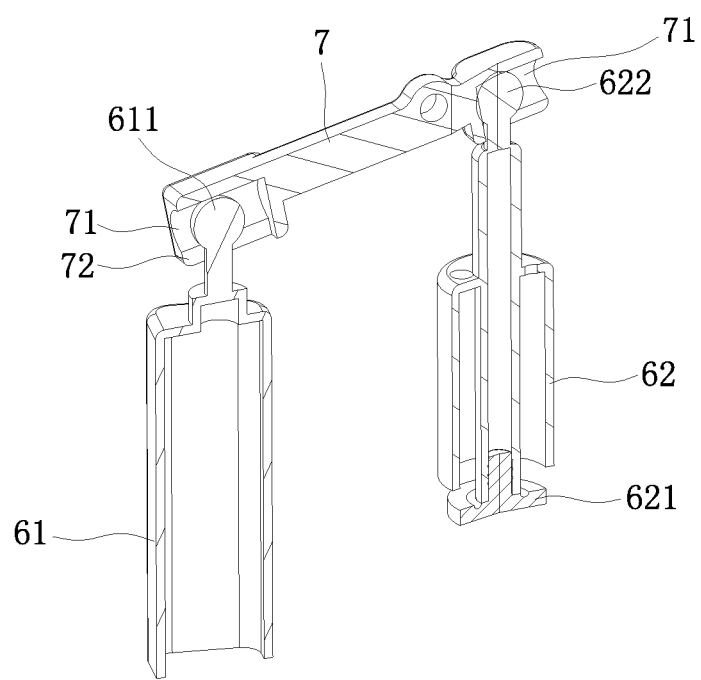
FIG. 14 is a cross-sectional view showing the assembly of the lever and the float of the present invention.

In this embodiment, as shown in FIG. 12 to FIG. 14, a cylindrical hole 71 is formed in either end of the lever 7. The bottom of the cylindrical hole 71 is provided with a slot 72. Ball heads 611, 622 are connected to the outer float 61 and the inner float 62, respectively. The ball heads 611, 622 are engaged in the cylindrical holes 71 to be mounted at the two ends of the lever 7, respectively.

The leak-proof water tank 53 is mounted on the valve body 1. The leak-proof water tank 53 is in communication with the inner water tank 52 via the water-passing channel 531. The swing of the lever 7 enables the plug 621 to close the water-passing channel 531 or to open the water-passing channel 531. The leak-proof float 63 is disposed in the leak-proof water tank 53. The leak-proof float 63 is connected with the limiting member 44. The rising of the leak-proof float 63 drives the limiting member 44 to release the connecting rod 43. The compression spring 42 drives the swing rod 41 to swing and move the valve stein 2 and the water plugging stopper 3 downwards. The sealing end surface 22 blocks the back-pressure hole 31, and the water plugging stopper 3 blocks the water sealing surface 13, such that the water enters the back-pressure cavity 16 via the water-passing gap 18, and the water pressure enables the water-plugging stopper 3 to block the water sealing surface 13 to stop the water.

A first magnetic element 441 is mounted in the limiting member 44. Specifically, the first magnetic element 441 is mounted in the lower portion of the limiting member 44. A second magnetic element 631 that can be attracted to the first magnetic element 441 is mounted to the upper end of the leak-proof float 63. The rising of the leak-proof float 63 enables the second magnetic element 631 to attract the first magnetic element 441 to move the limiting member 44 downwards to release the connecting rod 43.

When the water inlet valve normally feeds in water, the water enters the outer water tank 51 from the water inlet hole 511 at the bottom of the outer water tank 51, and the water level of the outer water tank 51 rises, so that the outer float 61 placed in the outer water tank 51 rises, the lever 7 is driven to swing and link the inner float 62 placed in the inner water tank 52 to lower, so that the plug 621 installed at the lower end of the inner float 62 blocks the water-passing channel 531 that communicates the inner water tank 52 with the leak-proof water tank 53. As the water level of the outer water tank 51 continues to rise, the water overflows into the inner water tank 52. At this time, the water of the inner water tank 52 cannot enter the leak-proof water tank 53, and the leak-proof float 63 placed in the leak-proof water tank 53 does not actuate (does not float upwards), and the control valve opens the water inlet channel 11 of the valve body 1, such that the water inlet valve feeds in water normally.

When the water leaks, the water level of the outer water tank 51 gradually lowers, and the outer float 61 placed in the outer water tank 51 lowers, the lever 7 is swung to drive the inner float 62 placed in the inner water tank 52 to rise, so that the plug 621 installed at the lower end of the inner float 62 opens the water-passing channel 531 that communicates the inner water tank 52 with the leak-proof water tank 53. The water in the inner water tank 52 flows into the leak-proof water tank 53, and the leak-proof float 63 placed in the leak-proof water tank 53 actuates (float upwards). The leak-proof float 63 rises to cause the second magnetic element 631 to attract the first magnetic element 441. The limiting member 44 is driven to move down to release the connecting rod 43. The compression spring 42 drives the swing rod 41 to swing, and the valve stein 2 and the water plugging stopper 3 are moved downwards. The sealing end surface 22 blocks the back-pressure hole 31 and the water plugging stopper 3 blocks the water sealing surface 13, such that the water enters the back-pressure cavity 16 via the water-passing gap 18, and the water pressure enables the water-plugging stopper 3 to block the water sealing surface 13 to stop the water.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A water stop valve, comprising a valve body, a valve stein, a water plugging stopper, and a drive mechanism; a water inlet channel and a water outlet channel being formed in the valve body, a water sealing surface being disposed between the water inlet channel and the water outlet channel, the water sealing surface being in communication with the water inlet channel and the water outlet channel; a cavity being formed in the valve body above the water sealing surface, a mounting hole being formed in the valve body above the cavity; a middle portion of the valve stein being movably and sealedly mounted in the mounting hole, an upper portion of the valve stein extending out of the mounting hole and being connected to the drive mechanism, the drive mechanism driving the valve stein to move up and down, a back-pressure hole being formed in the water plugging stopper, a lower portion of the valve stein being movably mounted in the back-pressure hole of the water plugging stopper; the water-plugging stopper being disposed in the cavity, a water-passing gap being defined between the water-plugging stopper and the cavity, a back-pressure cavity being formed above the water-plugging stopper, the water-passing gap being in communication with the water inlet channel and the back-pressure cavity, the back-pressure cavity being in communication with the back-pressure hole, the back-pressure hole being in communication with the water outlet channel, a sealing end surface matching the back-pressure hole being formed on the valve stein; wherein when the valve stein moves upwards, the sealing end surface opens the back-pressure hole, and the water inlet channel is in communication with the water outlet channel to feed in water; when the valve stein moves downwards and drives the water plugging stopper to move downwards, the sealing end surface blocks the back-pressure hole, and the water plugging stopper blocks the water sealing surface, such that water enters the back-pressure cavity via the water-passing gap, and water pressure enables the water-plugging stopper to block the water sealing surface to stop the water.

2. The water stop valve as claimed in claim 1, wherein the lower portion of the valve stein is formed with a reduced neck section, and the reduced neck section of the valve stein is inserted in the back-pressure hole of the water plugging stopper.

3. The water stop valve as claimed in claim 1, wherein the sealing end surface is a wedge surface, and an upper end of the back-pressure hole is formed with a sealing slope matching the wedge surface.

4. The water stop valve as claimed in claim 1, wherein a sealing piston is sleeved on the middle portion of the valve stein, and the sealing piston is sealedly matched with the mounting hole of the valve body.

5. The water stop valve as claimed in claim 1, wherein the drive mechanism includes a swing rod, a compression spring, a connecting rod, and a limiting member; a middle portion of the swing rod is pivotally connected to the valve body, one end of the swing rod is connected to the valve stein, the valve stein is moved up and down with the swing rod; another end of the swing rod is connected to one end of the connecting rod, the compression spring is mounted in the valve body, one end of the compression spring abuts against the valve body, another end of the compression spring abuts against the other end connected with the connecting rod of the swing rod for applying a force to swing the swing rod; the limiting member is movably mounted on the valve body, the limiting member is configured to restrict movement of the connecting rod, when the limiting member is pressed downwards to release the connecting rod, the compression spring drives the swing rod to swing and move the valve stein and the water plugging stopper downwards.

6. The water stop valve as claimed in claim 5, wherein the limiting member is movably mounted in the valve body, a spring is mounted between the limiting member and the valve body, when the limiting member is pressed downwards, the connecting rod is released.

7. The water stop valve as claimed in claim 6, wherein the valve body is provided with a mounting seat, a receiving cavity is formed between the mounting seat and the valve body, the limiting member is disposed in the receiving cavity, a hole is formed in the mounting seat, a middle portion of the limiting member is a limiting portion, a lower portion of the limiting member is inserted into the hole, the limiting portion of the limiting member has a diameter greater than that of the hole; one end of the spring abuts against the mounting seat, and another end of the spring abuts against the limiting portion of the limiting member.

8. The water stop valve as claimed in claim 5, wherein an upper end of the limiting member is provided with a wedge portion, the connecting rod is provided with a recess corresponding to the wedge portion, the wedge portion of the limiting member is inserted into the recess of the connecting rod to restrict movement of the connecting rod.

9. The water stop valve as claimed in claim 5, wherein the swing rod is connected to the connecting rod through an engaging block and an engaging groove.

10. The water stop valve as claimed in claim 9, wherein the swing rod is provided with the engaging block, the connecting rod is provided with the engaging groove, and the engaging block of the swing rod is engaged in the engaging groove of the connecting rod to connect the swing rod to the connecting rod.

* * * * *